United States Patent [19]
Kaufman

[11] Patent Number: 6,136,897
[45] Date of Patent: Oct. 24, 2000

[54] RUBBER PROCESSING ADDITIVE

[75] Inventor: Harvey Lewis Kaufman, Hudson, Ohio

[73] Assignee: Polymer Process Technologies, Inc., Stow, Ohio

[21] Appl. No.: 09/184,371

[22] Filed: Nov. 2, 1998

[51] Int. Cl.$^7$ ................ C08L 3/04; C08L 9/00; C08K 3/34
[52] U.S. Cl. ............. 524/47; 524/450; 524/571; 524/575.5; 106/215.2
[58] Field of Search ............... 523/128; 524/47, 524/322, 450, 571, 575.5; 106/215.2, 617, 620

[56] References Cited

U.S. PATENT DOCUMENTS

| | | | |
|---|---|---|---|
| 4,348,492 | 9/1982 | Shasha et al. | 524/52 |
| 4,612,342 | 9/1986 | Kostinko | 524/450 |
| 4,888,378 | 12/1989 | Kostinko | 524/450 |
| 4,968,728 | 11/1990 | Wason | 523/216 |
| 4,983,651 | 1/1991 | Griffin | 524/47 |
| 5,223,559 | 6/1993 | Arraudeau et al. | 524/47 |
| 5,303,661 | 4/1994 | Yu et al. | 110/341 |
| 5,552,461 | 9/1996 | Redd et al. | 524/47 |
| 5,597,851 | 1/1997 | Romine et al. | 521/41 |
| 5,650,454 | 7/1997 | Hoover et al. | 524/47 |
| 5,658,651 | 8/1997 | Smith et al. | 442/59 |
| 5,710,200 | 1/1998 | Toratini et al. | 524/191 |
| 5,731,358 | 3/1998 | Pillai | 521/41 |
| 5,814,143 | 9/1998 | Freeman et al. | 106/450 |
| 5,877,244 | 3/1999 | Hoover et al. | 524/322 |

*Primary Examiner*—Edward J. Cain
*Assistant Examiner*—Katarzyna Wyrozebski
*Attorney, Agent, or Firm*—Emerson & Associates; Roger D. Emerson; Daniel A. Thomson

[57] ABSTRACT

A rubber-processing additive for use in bridging rubber grind and virgin rubber. The rubber-processing additive consists of a zeolite, a high molecular weight fatty acid, and a starch. The compound binds the rubber grind to the virgin rubber. The inventive compound is also composed of components that are non-toxic. The compound does not significantly affect the physical properties of the virgin rubber. A method for using a rubber-processing additive to bind rubber grind to virgin rubber is also provided. The method includes the step of adding the inventive compound to a mixture of rubber grind and virgin rubber.

17 Claims, No Drawings

RUBBER PROCESSING ADDITIVE

BACKGROUND OF THE INVENTION

I. Field of the Invention

This invention pertains to the art of rubber-processing additives, and more particularly, to the use of rubber grind in rubber formulations.

II. Description of the Related Art

It has been seen throughout the development and use of rubber and elastomers, that scrap rubber goods are a huge source of environmental hazard. So, for many years, the rubber industry has been concerned with the disposal of scrap rubber. Many attempts have been made to find ways to recycle the scrap rubber, or to destroy it. Many of the past methods have simply burned the scrap rubber or stacked it in huge piles in a large dumping site. The industry has been trying to find ways to cut down on the pollution caused by scrap rubber.

The use of scrap rubber in the production of new rubber is known in the art. The scrap rubber is generally processed so that is becomes a powder, known as rubber grind. The rubber grind is added to the virgin rubber to recycle the rubber grind. The industry has made several bridging compounds that allow the rubber grind to be substituted for virgin rubber, in concentrations of 1–20%. The problem with this is the compounds only allow use of 20% of the rubber grind, and the physical properties of the rubber are lowered. The scorch time and cure time can be affected by as much as 73%.

One known process is disclosed in U.S. Pat. No. 5,303,661 to Yu et al. Yu et al disclose a dry process for treatment of used rubber waste that is refined to get recycled material. The Yu patent discloses the use of zeolite, 1–10% by weight, which is used as a catalyst, causing the process oil to penetrate the rubber waste. One drawback of the Yu patent is it can only use 30% of the rubber waste. The Yu patent does not create a chemical reaction with the zeolite, and therefore the resultant rubber compound is not as strong as the rubber compound formed as a result of the present invention.

Known methods of recycling rubber grind require the use of a desulphurizing agent, pine tar, and calcium carbonate. This mixture is blended and heated for approximately 6–13 hours to obtain the recycled rubber. The mixture is heated at high temperatures that break off the sulfur, creating an oil. The oil is then turned back into the rubber polymer. The drawback of this process is the time involved and the high level of air pollution created by the compound. The gas given off during this process is also toxic.

The present invention contemplates a new and improved rubber-processing additive. Thus, this invention is simple in design, effective in use, and overcomes the foregoing difficulties and others while providing better and more advantageous overall results.

SUMMARY OF THE INVENTION

In accordance with one aspect of the present invention a new and improved rubber-processing additive includes a zeolite, a starch, and a high molecular weight fatty acid. The composition bonds together to form an organo-metallic polymer. The inventive compound acts as a bridging agent between the rubber grind and the virgin rubber.

In accordance with another aspect of the current invention, the composition consists of a zeolite, which is preferably a magnesium-alumino silicate, a starch, which is preferably cornstarch, and a high molecular fatty acid, which is preferably stearic acid.

In accordance with yet another aspect of the current invention, the composition comprises 78.15–88.15% by weight of the zeolite, 5.6–15.6% by weight of the starch, and 1.25–11.25% by weight of the high molecular weight fatty acid.

One advantage of the present invention is that the compound used is inexpensive in relation to the known art.

Another advantage of the current invention is that every component of the compound is non-toxic.

Still another advantage of the current invention is the processing time is short compared to the known art.

Yet another advantage of the present invention is that the inventive compound allows at least 40% of rubber grind to be used in the virgin rubber as opposed to the 20–30%, or less, in the known art.

Still yet another advantage of the current invention is that the inventive compound is a high speed physical blend, that by the shear and torque of the blender are chelated together, and the production of the compound is constant from batch to batch.

Still other benefits and advantages of the invention will become apparent to those skilled in the art upon a reading and understanding of the following detailed specification.

DESCRIPTION OF THE PREFERRED EMBODIMENT

It has been seen throughout the development of chemicals for the rubber and plastic industry that certain compounds can help in the production, or processing, of them. Uses of such compounds as stearic acid, and other high molecular weight fatty acids, aid in dispersion of other materials in the compound and the time element involved in the milling of these elastomers. The chemicals used as process improvement modifiers are usually organic. The current invention, allows the use of up to 40% rubber grind to be substituted for virgin rubber in the rubber production. The inventive compound acts as a bridging agent between the rubber grind and the virgin rubber.

EXAMPLE 1

Composition of Compound

In the preferred embodiment, the processing additive comprises a zeolite material, starch, and a high molecular weight fatty acid. The zeolite, which has a morphology of cavities, incorporates the starch, and high molecular weight fatty acid. The preferred zeolite is a magnesium-alumino silicate, but any anionic zeolite, including sodium magnesium alumino silicate, calcium alumino silicate, and calcium magnesium alumino silicate, may be used. The preferred starch is cornstarch, which was chosen because it is relatively inexpensive. Any starch known in the art may be used. The preferred high molecular weight fatty acid is stearic acid, which was chosen because it is relatively inexpensive. As with the starch, any high molecular weight fatty acid known in the art may be used.

EXAMPLE 2

Preparation of Compound

The inventive compound is created by a mixture of the following powders: zeolite, starch, and high molecular weight fatty acid. The powders are charged in a Henshel blender. The powders are blended at 25,000 rpm for 5–10 minutes. The temperature created in the blender is between 130–140° F. This temperature activates the components, creating a reaction that forms the compound. In the preferred embodiment the compound comprises 83.15% of the zeolite, 10.6% by weight of the starch, and 6.25% by weight of the high molecular weight fatty acid. The zeolite can range between 78.15–88.15% by weight, the starch can range between 5.6–15.6% by weight, and the high molecular weight fatty acid 1.25–11.25% by weight. The average rubber additive for the elastomer industry has to undergo a chemical reaction between two or more raw materials under reaction kettle conditions in production.

The inventive compound is a high-speed physical blend which, by the shear and torque of the Henshel blender, is chelated together and production of the compound is constant from batch to batch. The ease of preparation and batch constancy provides advantages over other additives known in the art. For example, usual rubber additives for the elastomer industry must undergo chemical reactions between two or more raw materials under reaction kettle conditions where many parameters such as temperature, pre-cure, and mix rate are necessarily controlled. It is found that in these known processes reaction products are costly and vary from production to production.

For the sake of comparison, in Tables 1 and 2, scorch time and cure time data is provided for virgin rubber and known additive blends. The scorch time is defined as the initiation time for the rubber curing process to begin and the cure time is defined as the end time designating the completion of the rubber curing process. The scorch and cure times are determined by an oscillating rheometer. As shown, the known additives have a significant negative impact on the scorch and cure times of the virgin rubber blends.

TABLE 1

When virgin rubber retread compound is substituted by 30% with De-Vulc ™ of 5 parts De-Link ™ and the TBBS accelerator and sulfur are proportionally adjusted at 0.7, i.e. 70%, the rheometer data at 150° become:

|  |  |  | $t_2$ (min) | $t_{90}$ (min) |
|---|---|---|---|---|
| Retread Compound |  |  | 5.58 | 8.73 |
|  |  | (PHR) |  |  |
|  | Masterbatch | 178.00 |  |  |
|  | TBBS | 1.20 |  |  |
|  | S | 1.50 |  |  |
|  |  | 180.70 |  |  |
| 70/30 Blend |  |  | 1.55 | 2.35 |
|  | Masterbatch | 124.60 |  |  |
|  | De-Vulc ™ | 53.40 |  |  |
|  | TBBS | 0.84 |  |  |
|  | S | 1.05 |  |  |
|  |  | 180.00 |  |  |

TABLE 2

When retread vulcanizate having the composition given in Table 1 is ground and devulcanized with 3 and 5 parts De-Link ™ reactant, comparing the 100% De-Vulc ™ with virgin retread compound gives the following rheometer data:

|  |  | $t_2$ (min) | $t_{90}$ (min) |
|---|---|---|---|
| Retread Compound |  | 5.2 | 7.55 |
|  | (PHR) |  |  |
| Masterbatch | 178 |  |  |
| TBBS | 1.2 |  |  |
| S | 1.5 |  |  |
| De-Vulc ™ | 5.0 De-Link ™ | 2.33 | 9.6 |
| De-Vulc ™ | 3.0 De-Link ™ | 2.12 | 8.48 |

EXAMPLE 3

Physical Data

As shown in Table 3, the addition of the inventive compound plus a 40% rubber grind does not significantly effect the scorch time or the cure time. The Shore A hardness is also not significantly effected by the addition of the inventive compound. The Shore A hardness is a scale used to determine the relative hardness of the particular rubber being tested. A Shore durometer is used, which gives a reading from 0–100 (0 being the softest, 100 being the hardest). Sample 1 in Table 3 is a control sample without any scrap rubber or the inventive compound added. Sample 2 is the natural rubber compound with 40% by weight rubber grind added and 2% by weight of the inventive compound added. Sample 3 is an EPDM compound with no rubber grind or inventive compound added. Sample 4 is the EPDM with 40% by weight of the rubber grind and 2% by weight of the inventive compound added. Sample 5 is a natural rubber/SBR compound with no rubber grind or inventive compound added. Lastly, Sample 6 is the natural rubber/SBR compound with 40% by weight rubber grind and 2% by weight of the inventive compound added. The results given in Table 3 show no statistical difference in the scorch time, cure time, or Shore A hardness of the compounds with the rubber grind and inventive compound added.

TABLE 3

Laboratory Analysis Data of Rubber Compounds

|  | Sample | Scorch Time (min) | Cure Time (min) | Shore A Hardness |
|---|---|---|---|---|
| 1 | Natural Rubber Control | 2.83 | 7.08 | 43 |
| 2 | Natural Rubber +40% Grind + 2% Additive | 2.77 | 5.75 | 42 |
| 3 | EPDM Control | 5.72 | 10.32 | 44 |
| 4 | EPDM + 40% Grind + 2% Additive | 4.65 | 9.95 | 51 |
| 5 | NR/SBR Control* | 5.65 | 7.65 | 50 |
| 6 | NR/SBR +40% Grind + 2% Additive* | 3.78 | 5.03 | 51 |

*Extremely Sensitive Compound

EXAMPLE 4

Carbon Black Samples

In Table 4, the results of testing performed on a natural rubber sample with heavily loaded carbon black are given. Heavily loaded is defined as being between 30–70% be weight of the compound. The control is a proprietary natural rubber recipe heavily loaded with carbon black. Compound #1 is the control with 1.25% by weight of the inventive additive and 20% by weight recycled grind. Compound #2 is the control with 20% De-Vulc™.

TABLE 4

Proprietary Natural Rubber Recipe: Heavily Loaded Carbon Black

| | % Inventive Compound | % Powder | Scorch Time (min) | Cure Time (min) | Shore A Hardness |
|---|---|---|---|---|---|
| Control | 0 | 0 | 4.30 | 8.20 | 44 |
| Compound #1 | 1.25 | 20 | 3.60 | 7.50 | 45 |
| Compound #2 | 0 | 20 (De-Vulc ™) | 2.81 | 6.00 | 52 |

EXAMPLES 5–8

Tables 5–8 show similar results to those shown in the aforementioned examples. When added to natural rubber, the inventive compound can bridge up to 40% by weight of rubber grind to the virgin rubber, creating a stable new rubber polymer.

In the preferred embodiment the inventive compound is added at 2% by weight, but any amount can be added using sound engineering judgment. Increasing the percentage of the inventive compound increases the Shore A hardness of the rubber.

TABLE 5

Proprietary Natural Rubber Recipe

| | % Inventive Compound | % Powder | Scorch Time (min) | Cure Time (min) | Shore A Hardness |
|---|---|---|---|---|---|
| Control | 0 | 0 | 1.88 | 3.18 | 64 |
| Compound #1 | 1.25 | 0 | 1.88 | 2.97 | 63 |
| Compound #2 | 1.25 | 16 | 1.78 | 2.92 | 64 |
| Compound #3 | 0 | 60.75* | 2.2 | 5.10 | 54 |
| Compound #4 | 1.25 | 60.75 | 2.5 | 4.8 | 55 |
| Compound #5 | 1.25 | 60.75 | 2.6 | 5.8 | 58 |

*2 step process to get De-Vulc ™

TABLE 6

Proprietary Neoprene Compound

| | % Inventive Compound | % Powder | Scorch Time (min) | Cure Time (min) | Shore A Hardness |
|---|---|---|---|---|---|
| Control | 0 | 0 | 2.1 | 4.8 | 55.00 |
| Compound #1 | 1.25 | 10 | 2.2 | 5.2 | 57.62 |
| Compound #2 | 1.25 | 20 | 2.8 | 5.6 | 58.05 |

TABLE 7

Proprietary EPDM Test Recipe

| | % Inventive Compound | % Powder | Scorch Time (min) | Cure Time (min) | Shore A Hardness |
|---|---|---|---|---|---|
| Control | 0 | 0 | 5.72 | 10.32 | 44 |
| Compound #1 | 1.25 | 20 | 4.65 | 9.95 | 51 |

TABLE 8

Proprietary Natural Rubber/SBR Recipe

| | % Inventive Compound | % Powder | Scorch Time (min) | Cure Time (min) | Shore A Hardness |
|---|---|---|---|---|---|
| Control | 0 | 0 | 3.4 | 6.5 | 45 |
| Compound #1 | 1.25 | 31 | 3.5 | 7.0 | 50 |

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A composition for use in dispersing rubber grind in rubber formulations, the composition comprising a blend of:
    a) 78.15–88.15% by weight of a zeolite;
    b) 5.6–15.6% by weight of a search; and,
    c) 1.25–11.25% by weight of a high molecular-weight fatty acid.

2. The composition of claim 1, wherein the zeolite is a magnesium-alumino silicate.

3. The composition of claim 1, wherein the starch is cornstarch.

4. The composition of claim 1, wherein the high molecular-weight fatty acid is stearic acid.

5. A composition for use of rubber grind in rubber formulations, the composition comprising a blend of:
    a) 83.15% by weight of a magnesium-alumino silicate;
    b) 10.6% by weight of cornstarch; and,
    c) 6.25% by weight of stearic acid.

6. A method for using rubber grind in rubber formulations, the method comprising the steps of:
    a) providing a predetermined amount of a rubber selected from the group consisting of natural rubbers, synthetic rubbers, and mixtures of any of the foregoing;
    b) providing a predetermined amount of rubber grind;
    c) providing an organo-metallic composition, for use as a dispersing agent, comprising 78.15–88.15% by weight of a zeolite, 5.6–15.6% by weight of a starch, and 1.25–11.25% by weight of a high molecular-weight fatty acid;
    d) adding a predetermined amount of the organo-metallic composition to a mixture of the rubber and the rubber grind.

7. The method of claim 6, wherein the compound is added at 2 to 5 parts per hundred to the rubber.

8. The method of claim 6, wherein the zeolite is a magnesium-alumino silicate.

9. The method of claim 6, wherein the starch is cornstarch.

10. The method of claim 6, wherein the high molecular-weight fatty acid is stearic acid.

11. The method of claim 8, wherein the composition comprises 83.15% by weight of the magnesium-alumino silicate.

12. The method of claim 9, wherein the composition comprises 10.6% by weight of the cornstarch.

13. The method of claim 10, wherein the composition comprises 6.25% by weight of the stearic acid.

14. A rubber compound formed by mixing:
    a) rubber selected from the group consisting of natural rubbers and synthetic rubbers with dispersing agent comprising 78.15–88.15% by weight of zeolite, 5.6–15.6% by weight of a starch, and 1.25–11.25% by weight of a high molecular-weight fatty acid.

15. The rubber compound of claim 14, wherein the zeolite is a magnesium-alumino silicate.

16. The rubber compound of claim 14, wherein the starch is cornstarch.

17. The rubber compound of claim 14, wherein the high molecular weight fatty acid is stearic acid.

* * * * *